United States Patent [19]

Frank et al.

[11] Patent Number: 4,577,549

[45] Date of Patent: Mar. 25, 1986

[54] HYDRAULIC CYLINDER PROVIDED WITH LOW FRICTION PLATED INTERNAL SURFACE

[75] Inventors: Charles A. Frank, Farmington Hills; David J. Compton, Troy, both of Mich.

[73] Assignee: Automotive Products plc, Warwickshire, England

[21] Appl. No.: 594,325

[22] Filed: Mar. 28, 1984

[51] Int. Cl.[4] ...................... B21D 39/00; B32B 15/08; B32B 27/00

[52] U.S. Cl. ...................................... 92/169; 428/639; 428/936

[58] Field of Search ............... 428/621, 626, 639, 614, 428/667, 327, 422, 586, 936; 75/250, 231; 427/38; 92/169, 171

[56] References Cited

U.S. PATENT DOCUMENTS

| | | | |
|---|---|---|---|
| 3,421,972 | 1/1969 | Cromwell | 428/551 |
| 3,743,556 | 7/1973 | Breton | 428/639 |
| 4,145,481 | 3/1979 | Gupta | 427/38 |
| 4,162,616 | 7/1979 | Hayashida | 92/171 |
| 4,260,466 | 4/1981 | Shirahata | 427/38 |
| 4,438,153 | 3/1984 | Pinkhasov | 427/37 |

FOREIGN PATENT DOCUMENTS 4765032 3/1974 Japan .

*Primary Examiner*—Carlton R. Croyle
*Assistant Examiner*—Jane E. Obee
*Attorney, Agent, or Firm*—Hauke and Patalidis

[57] ABSTRACT

A hydraulic cylinder, such as more particularly the master cylinder of motor vehicle hydraulic brake system or of a motor vehicle clutch hydraulic control system, provided with a relatively thin plated coating, autocatalytically or electrolessly deposited, of nickel phosphorous matrix containing sub-micron particles of a polyfluorocarbon resin, preferably polyfluoroethylene. The plated coating provides a good wearing surface having self-lubricating properties provided by the exposed polyfluorocarbon resin particles smearing the surface of the coating, and reducing considerably squeaking noise during operation of the master cylinder. Alternatively, or additionally, the surface of the pistons may be provided with a plated coating.

20 Claims, 3 Drawing Figures

26 16 12 22 14 18 20 10 24

FIG. 1
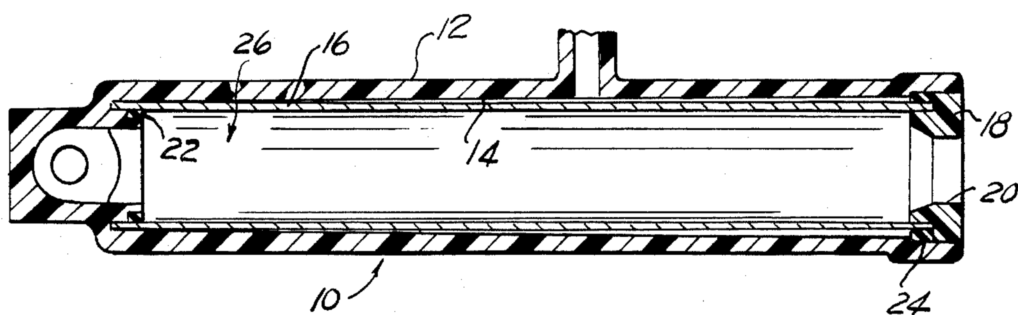
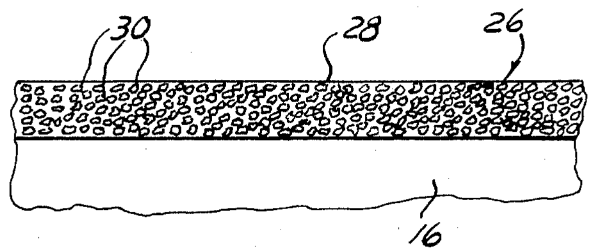
FIG. 2

HYDRAULIC CYLINDER PROVIDED WITH LOW FRICTION PLATED INTERNAL SURFACE

BACKGROUND OF THE INVENTION

The present invention relates to hydraulic cylinders and pistons, in general, and more particularly to hydraulic cylinders having their internal surface and pistons having their external surface treated such as to provide a wear resistant low friction surface, and to the method of obtaining such a surface.

The present invention has general applications to a variety of hydraulic cylinders and pistons, and more particularly it has particular applications to hydraulic slave and master cylinders as used in hydraulic brake systems and clutch hydraulic control systems of motor vehicles.

It is important that hydraulic cylinders be resistant to wear while at the same time causing no undue wear on piston seals, and that sliding friction or resistance between piston seals and cylinder walls be substantially low, for reducing hysteresis, vibration and noise, such as high frequency noise or squeak, without loss of sealing characteristics, more particularly in master cylinders. Secondarily, it is advantageous to have the surface of pistons provided with a coating which has a low coefficient of friction, especially at areas which may occasionally engage with areas of the associated cylinder wall.

SUMMARY OF THE INVENTION

The invention provides a surface coating primarily for hydraulic cylinders and secondarily for hydraulic pistons, the coating being obtained by an electroless process applying to the surface of a cylinder wall a thin film of nickel containing fine particles of polyfluorocarbon resin such as polytetrafluoroethylene.

The many objects and advantages of the present invention will become apparent to those skilled in the art when the following description of the best modes contemplated for practicing the invention is read in conjunction with the accompanying drawing wherein:

BRIEF DESCRIPTION OF THE DRAWING

FIG. 1 is a schematic representation of an example of hydraulic cylinder, in longitudinal section;

FIG. 2 is an enlarged view of a portion thereof; and

DETAILED DESCRIPTION OF THE PREFERRED EMBODIMENT

Figure 3:
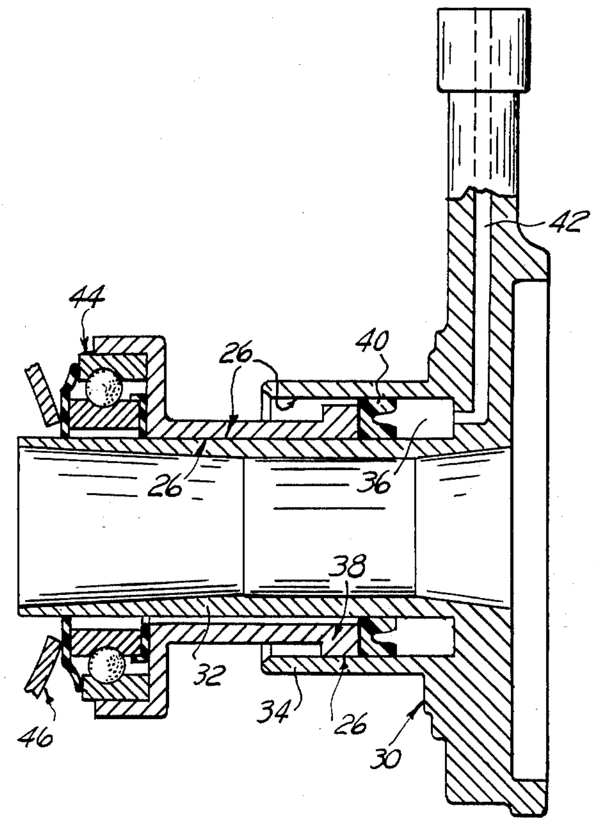
FIG. 3 is a schematic representation of another example of structure, namely an annular hydraulic cylinder-piston assembly for which the present invention has particular usefulness.

Referring to FIG. 1 of the drawing, there is illustrated, in longitudinal section and schematically, an example of hydraulic cylinder 10 such as, for example, the master cylinder of a motor vehicle clutch hydraulic control. The only portions of the cylinder 10 which are shown are what is relevant to a proper understanding of the present invention, the piston, piston seals and piston rod being omitted.

The hydraulic cylinder 10 is made of a housing 12 molded of an appropriate material which may be metal but which, preferably, is a plastic such as ABS, phenolic resin, polyamide, PVC, and the like. The molded plastic housing 12 has an internal bore 14 lined with a metallic sleeve 16, made of a length of thin walled steel tubing, for example. The metallic sleeve 16 is held within the bore 14 of the housing 12 by an end cap 18 provided with a central opening 20 for passage therethrough of the piston pushrod. O-rings, such as shown at 22 and 24, are installed at each end of the cylinder tubular sleeve 16 to provide an appropriately leakproof assembly with the housing 12.

The two-piece structure of the hydraulic cylinder 10 presents the particular advantage of utilizing a housing 12 made at low cost of a molding of plastic material, lined with the metallic tubular liner or sleeve 16, thin walled and obtained at low cost with accurate internal diameter dimensions and a good surface finish. Alternatively, the hydraulic cylinder 10 may be made of a metallic molding, aluminum alloy, cast iron, steel or the like, which in turn requires a relatively precise and costly machining of the bore surface for accurate dimensions, concentricity and surface finish. It will be appreciated that the present invention, as will appear from the following description, has applications to all types of hydraulic cylinders, hydraulic cylinders provided with a metallic liner or sleeve 16, as well as to hydraulic cylinders made of a single piece metallic casting or molding, or made of an assembly of separate elements welded or bolted together.

As illustrated schematically and in an exaggerated manner at FIG. 2, the liner or sleeve 16 is provided on its internal surface with a highly adhering thin film coating 26 of the order of 0.0002 in. in thickness, or about 5 to 6 microns. The coating 26 consists principally of a plating of autocatalytically or electrolessly deposited nickel forming a matrix 28, containing a small proportion of phosphorous as a result of using a plating bath containing a hypophosphite, such as sodium hypophosphite, in the plating bath as the reducing agent. The nickel-phosphorous matrix 28 acts as a supporting medium for particles of polyfluorocarbon resin, such as polytetrafluoroethylene particles 30. The polyfluorocarbon particles 30 are typically and preferably in the range of 0.1 to 1 micron in particle size, and they form from 20 to 30% by volume of the mass of the plated coating 26.

Although the plated coating 26 could also be obtained by the electrolytic process disclosed in detail in United States Letters Pat. No. 4,302,374, an autocatalytic or electroless plating process is preferred to a process relying on electrical energy and for avoiding the so-called "throwing power" inherent in all electro-plating processes. The "throwing power" could cause variations in the thickness of the plated coating 26 on the interior surface of the tubular member or sleeve 16, and it would require masking of the outside surface of the tubular member when electroplating the liner or sleeve of a composite cylinder as herein illustrated. The "throwing power" in an electrolytic process would also require masking of the exterior surface of a one-piece metallic cylinder and most likely using an auxiliary electrode for efficient plating of the cylinder bore surface.

One advantage resulting from adopting a composite hydraulic cylinder structure, as illustrated in FIG. 1, that comprises a plastic housing in which is installed a metallic liner or sleeve is that a plurality of cylinder liners or sleeves 16 are autocatalytically plated before installation in their respective plastic housing 12, by dipping the liners or sleeves vertically held in a plastic basket in an appropriate plating bath for an appropriate duration according to the desired thickness of the deposited plating. There is no necessity to mask the peripheral surface of the liner or sleeve, unless it is desired to cut cost by reducing by 50% the coated areas resulting in a reduction of 30 to 50% of the cost of the plating bath. If masking is found to be advantageous, masking can be effected at low cost in view of the simple geometric configuration of the peripheral cylindrical surface of the liner or sleeve 16.

The autocatalytically plated coating 26 consists of a relatively hard matrix of principally nickel and secondarily phosphorous in which are embedded fine particles 30 of a fluorocarbon resin such as polytetrafluoroethylene (PTFE). The fluorocarbon particles 30 at the surface of the coating 26 are exposed and more particularly become exposed as the coating 26 gradually wears during the life expectancy of the cylinder. The exposed particles when rubbed constantly by the reciprocating piston in the hydraulic cylinder, tend to smear the surface of the plated coating 26, providing a low friction surface having high lubricity, thus reducing considerably the coefficient of friction between the stationary surface of the cylinder wall and the reciprocating surface of the piston sealing ring or cup which is generally made of styrene-butadiene rubber, or ethylene-propylene copolymer, for example. The low coefficient of friction of the cylinder bore wall surface permits to reduce considerably, and even entirely eliminate, the squeaking noise caused by friction of the piston seal sliding on the cylinder bore surface. A further benefit provided by the compound plated coating 26 on the surface of the internal bore of a hydraulic cylinder is a considerable reduction of the wear of the cylinder internal wall and of the piston cup seal as a result of the improved wear quality of the cylinder wall and the substantial reduction in the coefficient of friction between the piston seal surface and the cylinder internal wall surface.

The plated coating 26 is obtained by dipping the sleeve 16, prior to installation in the cylinder housing 12, in an appropriate autocatalytic electroless plating bath containing an appropriate concentration of fluorocarbon particles maintained in suspension in the plating solution through agitation of the solution. The thickness of the plated coating is linearly proportional to the time duration of immersion in the plating bath. For example, by way of the plating baths in the following examples, a thickness of plated coating of 4.0 to 6.5 microns per hour is achieved through immersion in a bath maintained at 85°-90° C. and having a pH controlled within the range of 4.6 to 5. Plated coatings in the range of 2 to 25 microns have been obtained through immersion in the plating bath of a duration of a half hour to five or six hours.

EXAMPLE 1

To an autocatalytic or electroless nickel plating solution as, for example, the plating solution sold under the name NIKLAD 795 by the Allied Kelite Division of Witco of DesPlaines, Ill., is added five grams per liter of an appropriate additive containing PTFE particles of the required particle size range and other compounds, such as appropriate stabilizing agents and surfactants. An adequate additive is that available on the market under the name NIFLOR from Montgomery Plating Co. of Coventry, England.

The bath is maintained at a temperature of 90° C., and the parts to be plated, namely the cylinder liners or sleeves, placed vertically in a plastic basket, are fully immersed in the bath and maintained in the bath for two hours in order to obtain a plated coating about 5-6 microns in thickness and containing about 25% by volume of PTFE particles. With a fresh bath, and with proper agitation of the bath by continuously recirculating the bath solution by way of appropriate conduits and a pump, with the flow inlet disposed at the bottom of the tank, proportions of as high as 27-30% by volume of PTFE in the plating are achieved. With deterioration of the bath, the concentration of PTFE particles may drop to as low as 20% per volume. Although the concentration of PTFE particles may be monitored by analysis, the drop in concentration of particles is also detectable as a result of the naked eye appearance of the plated surface that changes drastically, turning from a uniformly colored matte surface to a surface having a speckled or spotty surface appearance.

When the bath becomes too aged to achieve aceptable results, it is more economical to dispose of the bath and replace it by a fresh solution than to try to improve the chemistry of the bath through additions of compounds.

EXAMPLE 2

To an autocatalytic or electroless nickel plating solution of ENTHONE 418 plating solution, available on the market from Enthone, Inc., subsidiary of Asarco of New Haven, Conn., is added 5 grams per liter of Niflor additive. The same results are achieved as by way of the bath formulation of Example 1.

EXAMPLE 3

A standard aqueous solution of liquid nickel sulfate is prepared at a concentration of 600 gr. of nickel sulfate ($NiSo_4$). A nickel plating bath is prepared having the following composition:

45 ml/l liquid nickel sulfate solution(equivalent to 6 gr/l of Ni ions)
25 gr/l sodium hypophosphite monohydrate ($NaH_2PO_2.H_2O$)
14.7 gr/l sodium citrate ($Na_3C_6H_5O_7.2H_2O$)
35 gr/l sodium glycolate (HO—$CH_2COO$ Na)
1.5 ml/l NIKLAD 795-M additive
5 gr/l NIFLOR additive Treating hydraulic cylinder liners or sleeves in the above bath maintained at 90° C. for 2 hours yielded surface platings containing up to 30% by volume of TFLE particles with a fresh bath, decreasing to a proportion of 20-21% of PTFE particles with an aged bath prior to discarding the bath.

The proportions of the constituents of the bath may be varied within certain limits as follows:

35-60 ml/l liquid nickel sulfate solution
22-30 gr/l sodium hypophosphate (equivalent to 5 to 7.5 gr/l of Ni ions)
12-18 gr/l sodium citrate
30-50 gr/l sodium glycolate Higher concentrations of liquid nickel sulfate tend to slightly increase the proportion of nickel in the plated coating. The hardness of the coatings tends to slightly increase with an increase of sodium hypophosphate.

The bath of Example 3 provides good suspension of the NIFLOR additive in the bath without requiring excessive agitation of the bath. Overnight rest of the bath causes some particles precipitation to the bottom of the tank which are rapidly dispersed through agitation by pump circulation of the bath.

For some applications it is advantageous to apply a plated coating to the surface of the piston of a hydraulic system master cylinder or a slave cylinder, in addition to applying a coating to the surface of the cylinder wall, for the purpose of reducing friction and wear of the surface that may become engaged in operation, and it may also be advantageous to coat the surface of the piston of slave cylinders.

FIG. 3 schematically illustrates an annular hydraulic cylinder piston assembly, such as a slave cylinder piston assembly for operating the throw-out bearing of mechanical clutch, the assembly being disposed concentrically around the driveshaft coupling a clutch disc to the driveshaft of a gearbox of a motor vehicle. The slave cylinder takes the form of a housing 30 provided with concentric tubular members 32 and 34 preferably cast integral as shown and made, for example, out of steel or preferably an aluminum alloy. An annular cylinder chamber 36 is there formed in the space between the two tubular members 32 and 34, in which is reciprocably disposed an annular piston 38. An annular elastomeric seal 40 is disposed on one side of the annular piston 38, and hydraulic fluid introduced into the annular chamber 36 through a passageway 42 displaces the elastomeric annular seal 40 and the annular piston 38 to the left, as seen in the drawing, thus displacing to the left a throw-out bearing 44 mounted on the end of the annular piston 38 projecting from the cylinder housing 30. The throw-out bearing 44 is held on the end of the annular piston 38 such that its free revolving race engages the release fingers 46, of the clutch, not shown.

When the hydraulic fluid is withdrawn from the cylinder in the annular chamber 36, the annular piston 38 is allowed to be displaced to the right under the action of the displacement of the end of the clutch spring fingers 46, for engagement of the clutch. It is advantageous to provide the walled surfaces of the annular cylinder 36 with an autocatalytically plated coating 26, consisting of a relatively hard matrix of nickel and phosphorous, in which are embedded fine particles of fluorocarbon resin, such as polytetrafluoroethylene to reduce hysteresis and friction, and also provides a similar coating on the peripheral surfaces of the annular piston 38, as the structure of FIG. 3 results in considerable areas in rubbing engagement between the surface of the piston 38, internal as well as external surface, with the internal surface of the tubular member 30 for forming the outer wall of the annular chamber cylinder 36 and with the peripheral surface of the tubular member 32. In the structure of FIG. 3, the piston 38 is illustrated as having substantial peripheral clearance as well as internal clearance such that, in operation, the annular piston 38 may be laterally displaced in attempting to align itself with the clutch axis and also would tend to angulate such as to seek an axis coinciding with the clutch axis, which axis may be slightly different from the axis of the housing tubular member 32.

Having thus described the present invention by way of examples of the method for practicing the invention, modification whereof will be apparent to those skilled in the art, what is claimed as new is as follows:

1. A hydraulic cylinder having an internal metallic surface provided with an adhering autocatalytically deposited nickel plating forming a matrix containing from 20 to 30% by volume of particles of a fluorocarbon resin of a particle size in the range of 0.1 micron to 1 micron, said plating being in the range of 2 to 25 microns in thickness, wherein said matrix contains 2 to 14% by weight of phosphorous.

2. The hydraulic cylinder of claim 1 wherein said hydraulic cylinder is a clutch hydraulic control master cylinder.

3. The hydraulic cylinder of claim 1 wherein said plating is about 5 microns in thickness.

4. The hydraulic cylinder of claim 3 wherein said hydraulic cylinder is a clutch hydraulic control master cylinder.

5. The hydraulic cylinder of claim 1 wherein said fluorocarbon resin is polytetrafluoroethylene.

6. The hydraulic cylinder of claim 5 wherein said hydraulic cylinder is a clutch hydraulic control master cylinder.

7. The hydraulic cylinder of claim 5 wherein said plating is about 5 microns in thickness.

8. The hydraulic cylinder of claim 7 wherein said hydraulic cylinder is a clutch hydraulic control master cylinder.

9. In a hydraulic apparatus comprising a cylinder member and a piston member reciprocable therein, the improvement comprising one of said members having a metallic surface provided with an adhering autocatalytically deposited nickel plating forming a matrix containing from 20 to 30% by volume of particles of a fluorocarbon resin of a particle size in the range of 0.1 micron to 1 micron, said plating being in the range of 2 to 25 microns in thickness, wherein said matrix contains 2 to 14% by weight of phosphorous.

10. The improvement of claim 9 wherein said cylinder is a clutch hydraulic control master cylinder.

11. The improvement of claim 9 wherein said cylinder member has an annular chamber and said piston is an annular piston disposed in said cylinder annular chamber.

12. The improvement of claim 9 wherein said plating is about 5 microns in thickness.

13. The improvement of claim 12 wherein said cylinder is a clutch hydraulic control master cylinder.

14. The improvement of claim 12 wherein said cylinder member has an annular chamber and said piston is an annular piston disposed in said cylinder annular chamber.

15. The improvement of claim 9 wherein said fluorocarbon resin is polytetrafluoroethylene.

16. The improvement of claim 15 wherein said cylinder is a clutch hydraulic control master cylinder.

17. The improvement of claim 15 wherein said cylinder member has an annular chamber and said piston is an annular piston disposed in said cylinder annular chamber.

18. The improvement of claim 15 wherein said plating is about 5 microns in thickness.

19. The improvement of claim 18 wherein said cylinder is a clutch hydraulic control master cylinder.

20. The improvement of claim 18 wherein said cylinder member has an annular chamber and said piston is an annular piston disposed in said cylinder annular chamber.

* * * * *